March 23, 1965  H. A. STEINBERG  3,174,476
COVER CONSTRUCTION FOR HEATING COMPARTMENT OF SOLAR OVEN
Filed Dec. 30, 1963
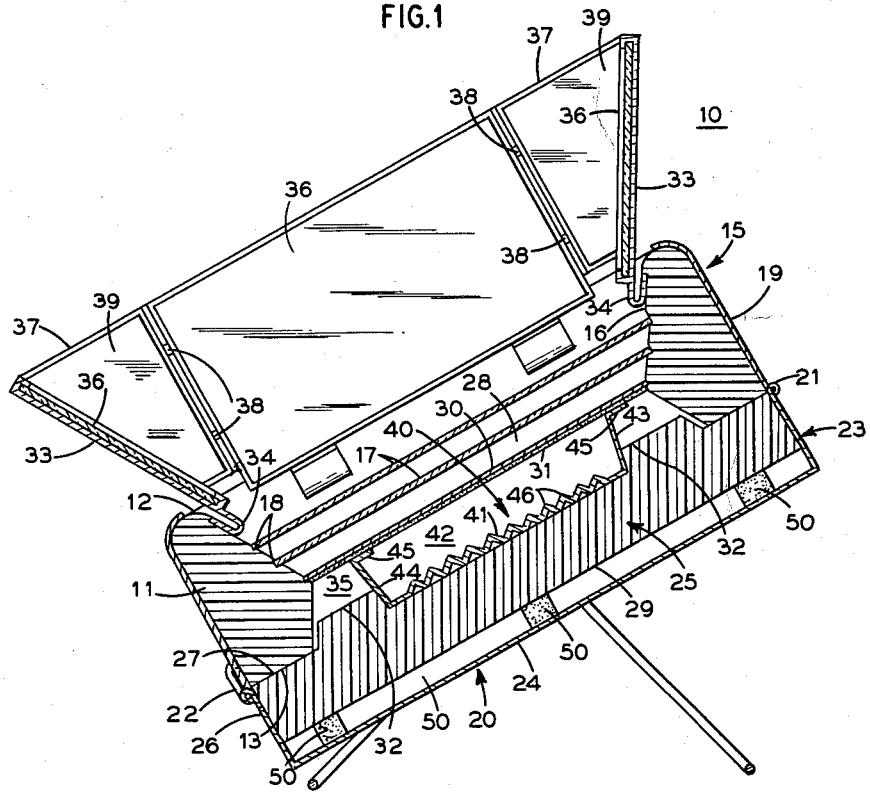
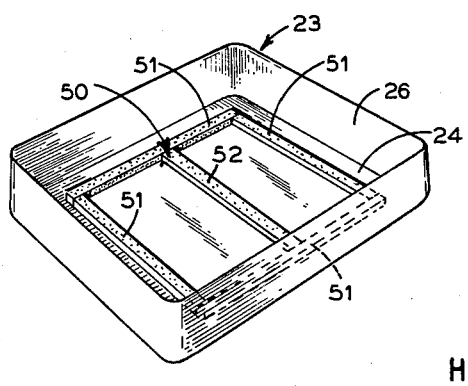
INVENTOR.
Hyman A. Steinberg
BY
ATTORNEY

United States Patent Office 3,174,476
Patented Mar. 23, 1965

3,174,476
COVER CONSTRUCTION FOR HEATING
COMPARTMENT OF SOLAR OVEN
Hyman A. Steinberg, 7—25 166th St., Whitestone, N.Y.
Filed Dec. 30, 1963, Ser. No. 334,341
8 Claims. (Cl. 126—270)

This invention relates to ovens, or more specifically, solar ovens, having a heating compartment with one wall constituted by a cover closing the heating compartment. More particularly, the present invention is directed to a novel cover construction for such a solar oven and by means of which a much more effective and floating type of seal may be obtained between the heat insulation of the body of the solar oven and the heat insulation of the cover.

Solar ovens essentially comprise wall means, or the like, defining a heating chamber or compartment, and further comprise means for concentrating heat energy to elevate the temperature of the heating compartment.

In one form of solar oven which has been practically successful, there is a casing means of essentially heat insulating material laterally defining a heating chamber or compartment. This heating chamber or compartment has a pair of substantially parallel walls, the normally uppermost one of which is constituted by a substantially flat metallic grill. The casing means includes a body structure supporting the flat metallic grill and which is essentially in the form of a laterally walled chamber open at both end surfaces of the body means, and further includes a cover. The aforementioned grill is disposed adjacent the inner end surface of the body, and means are provided at the outer end surface of the body to reflect and concentrate solar energy onto the grill.

The heating chamber or compartment is defined by a space in the body means beneath the grill, and further by the cover, which is of heat insulating material and is hingedly connected to the body of the casing. The inner surface of the cover is provided with means for locating and positioning a food pan, or food heating chamber, which may be made of any suitable material such as, for example, metal foil, or the like.

In order to fully utilize the available solar energy to the maximum extent and with the greatest efficiency, it is desirable that the heating chamber or compartment be thoroughly insulated from the atmosphere by suitable heat insulating means. This is effected by making the lateral walls of the body means of heat insulating material and by making the portion of the cover which contacts these lateral walls and which supports the foot pan also of heat insulating material. Because manufacturing variations will not permit continuous contact along the faces of the insulation, it has been the practice to provide gasket means between the mating surfaces of the cover and the body means to insure a tight sealing of the heating chamber.

However, such gasketing means between the door and the body of the solar oven makes the closing and locking of the door difficult and requiring excessive force. In addition, such gasketing, if not the full width and perimeter of the mating surface, does not provide a continuous and effective seal. Such gasketing is also subjected to deterioration because of proximity to the heating chamber. It may be further stated that, as manufactured and sold, such solar ovens include a metal or wood casing surrounding the body means and a metal or wood casing surrounding those portions of the cover which are not in direct engagement with the body means.

In accordance with the present invention, the foregoing difficulties encountered in obtaining a tight seal between the cover and the body means are avoided in a novel manner, and in a manner which allows for some play in the seating of the cover on the body means and for easy closing and locking of the cover; and which also compensates for manufacturing dimensional variations. More specifically, a space is provided between the outer surface of the body of heat insulation material in the cover and the outer wall of the casing surrounding the same. Resilient means are disposed in this space between the body of heat insulation material of the cover and the outer end wall of the metal or wood casing thereof in such a manner as to let the body of heat insulation float to some extent within the casing while being laterally confined by the casing side walls. This provides for a floating free fit between the body of heat insulation material of the cover and the heat insulation material of the solar oven body while further allowing for easy closing of the cover.

More particularly, the resilient means disposed between the body of heat insulation means of the cover and the outer end wall of the metal casing thereof may comprise spaced strips or pieces of plastic or rubber foam material, and these strips may be disposed in any manner and at any points to adequately support the heat insulating body of the cover. For example, the strips may extend peripherally around the insulating body outer surface, and even centrally across the latter. Specifically the strips may be ⅛ inch to ¼ inch thick and may be adhesive-coated on a pair of opposite surfaces so they may be easily adhered to the end wall of the casing and to the body of heat insulation material therein. The strips or pieces may be any width but are preferably from ¼ inch to ¾ inch wide, although this is by way of example only.

For an understanding of the principles of the invention, reference is made to the following description of a typical embodiment thereof as illustrated in the accompanying drawings. In the drawings:

FIG. 1 is a transverse-sectional view of a solar oven incorporating the invention, and illustrating the oven as tilted during use and with the cover closed to seal the food heating chamber; and FIG. 2 is a perspective view of the casing of the cover with the resilient strips adhesively secured against the outer wall thereof.

Referring to the drawings, and particularly to FIG. 1 thereof, a typical solar oven, selected by way of example only, is indicated at 10 as including a body 15 and a cover 20. The oven is generally rectangular in plan, and body 15 comprises four side walls 11, of heat insulating material, extending between the outer and inner end surfaces 12 and 13, respectively, which latter lie in substantially parallel plains perpendicular to the exterior surfaces 14 of the walls 11. The inner surfaces 16 of body sidewalls 11 extend at an angle to the outer surfaces 14 thereof so as to define an inwardly converging opening through body 15. In the particular solar oven selected by way of example, inner surfaces 16 extend at an angle of substantially 60° with respect to the end planes 12 and 13 of the body. The outer surface of the heat insulating walls 11 of body 15 is enclosed within a metal or wood casing indicated generally at 19.

Cover 20 is hinged to body 15 by hinge means indicated at 21, and may be retained in closed position by releasable latch means indicated at 22. Cover 25 includes a body of heat insulation material indicated at 25 and enclosed within a pan-shape metal or wood casing 23 having an outer wall 24 and sidewalls 26. Cover 20 is arranged to close the inner end of body 15 and, in the closed position, to have the inner plane surface 27 of heat insulation body 25 in substantial contact with the inner plane end surface 13 of body 15.

At a short distance inwardly from the outer end surface 12 of body 15, a pair of substantially parallel plates 17 of transparent material are mounted on ledges 18 in the inner surfaces 16 of walls 11, these plates 17 preferably being in parallel relation with each other and in sealing relation with the surfaces 16 of walls 11 so as to define a substantially dead airspace therebetween. Inwardly of the innermost plate 17 there is a substantially flat grill 30 of heat absorbing and heat conductive material, such as a suitable metal which may be blackened or otherwise treated so as to increase its solar energy absorption. The inner surface of grill 30 may be coated with a suitable plastic material 31 such as a fluorocarbon or silicone resin, to which food particles will not adhere and which is heat resistant. Grill 30 is also supported in ledges in the inner surfaces 16 of sidewalls 11, and is preferably in sealing relation with the inner surfaces of the sidewalls so as to define a dead airspace 28 between the innermost plate 17 and the grill 30.

Grill 30 is spaced outwardly from the major portion of the inner surface 27 of cover 20 and grill 30, conjointly with surface 27 and the portions of sidewalls 16 inwardly of grill 30, defines a heating compartment generally indicated at 35. Chamber 35 is arranged to receive a food pan or food chamber 40 which, in the embodiment illustrated, is substantially rectangular in plan and somewhat smaller in area than the grill 30. Pan 40 includes a bottom wall 41, arranged to rest on the inner surface 27 of the body 25 of cover 20, a pair of substantially parallel sidewalls 42, an upper-end wall 43, and a lower-end wall 44, both terms "upper-end" and "lower-end" referring to the orientation of pan 40 when solar oven 10 is tilted as it is during normal use.

Pan 40 is preferably formed in any suitable manner, from suitable material such as aluminum foil, and bottom wall 41 may be formed with ridges or ribs 46 ascending substantially parallel to end walls 43 and 44. The upper edges of end walls 43 and 44 are formed with flat flanges 45, one directed inwardly and the other directed outwardly, and which are arranged to lie in substantially planar contact with grill 30.

To retain pan 40 in position, the inner surface 27 of the heat insulation body 25 of cover 20 may be formed with suitable retaining means, herein illustrated as a substantially trapezoidal rib shaped to conform to the lower edges of the side and end walls of the pan 40. The spacing of surface 27 of block 25 of cover 20 from grill 30, in the closed position of cover 20, is such that the flanges 45 and the upper edges of the sidewalls 42 are maintained in heat conducting contact with the inner surface-coating 31 of grill plate 30.

The opening in the outer surface 12 of body 15 may be closed by a plurality of walls 33 each hinged at its inner edge to the inner surface 16 of wall 11 of body 10, as indicated at 34. Each wall 33 extends, in the open position thereof, substantially parallel to the inner surface 16 of its associated wall section 11. Each wall 33, which may be made of a suitable plastic composition material or of any composition material, or of any other suitable material, has a mirror 36 supported on its inner surface. To form a competely mirrored or light entry tunnel or opening for the solar oven in its operative position, each sidewall 33 has a trapezoidal corner wall 37 hinged thereto, as at 38, and each corner wall 37 has a mirror 39 on its inner surface.

The mirrored walls 33 and 37 are arranged to be folded, in substantially flat overlapping relation, to close the opening in the outer end 12 of body 15. When solar oven 10 is to be placed in use, each of the walls 33 and 37 is folded outwardly so that walls 33 will extend at an angle of substantially 60 degrees to the plane of the grill 30, suitable means being provided to maintain the walls in this position. The advantages of such a disposition are set forth fully in my Patent No. 3,025,851, issued March 20, 1962.

In the operation of solar oven 10, the latter is tilted in the direction of the sun in such a manner that end wall 44 of pan 40 is normally lower than wall 43 thereof. In this position, the sun's rays pass through transparent plate 17 and impinge upon metal grill plate 30 which absorbs the solar energy. Light entering into oven 10 is reflected by mirrors 36 and 39 in such a manner that all of the solar energy is concentrated upon grill 30, thus to heat the heating compartment 35 containing food chamber pan 40.

When cover 20 is swung open and food pan 40 is placed in position thereon, food may be placed in the pan 40 after which the cover may be closed so that the rim of pan 40 will have contact with the inner surface of grill 30. The oven is then tilted to a position where the sun's rays may most effectively enter into the oven.

As stated, it is desirable to maintain a good seal between the body of insulation 25 of cover 20 and the insulated wall 11 of the body 15. In effect, this means maintaining a tight seal between the inner end surface 13 of body walls 11 and the inner end surface 27 of the insulating body 25 of cover 20. The previously used gasket means disposed between these two surfaces made the cover 20 very difficult to close and latch, as well as having the disadvantages previously mentioned. These difficulties are avoided in the construction which will now be described.

Referring now to FIGS. 1 and 2, in advance of placing the insulating body 25 into the casing or pan 23, strips or pieces 50 of resilient material are disposed on the inner surface of the end wall 24 of pan 23, at any desired locations, to support body 25. These strips or pieces may be of plastic or rubber foam material from ⅛ inch to ¼ inch thick and having any width, such as, for example, widths of ⅛ inch to ¼ inch. In the particular example shown in FIG. 2, the strips are arranged to form a rectangle which is spaced somewhat inwardly of the sidewalls 26 of casing for pan 23, and this rectangle includes the four side strips 51. A cross strip 52 is arranged to divide the rectangle formed by the side strip 51 in half. The strips 50, 51 and 52 may have an adhesive coating on each surface thereof, preferably of pressure-sensitive adhesive. Thus, the strips may be readily adhered to the inner surface of end wall 24 of metal casing 23. After strips 50 are in position, body 25 of heat insulation material is placed within the casing 23 with its outer side surfaces in engagement with the inner surfaces of the side walls 26 of pan 23. The bottom surface 29 of insulating body 25 is pressed into engagement with the exposed adhesive coated surface of the strips 50 and thereby the body 25 is anchored to the end wall 24 of wood or metal casing or pan 23.

Body 25 may float to some extent within the pan or casing 23 and is biased outwardly by the resilience of the strips 50. Thus, when cover 20 is closed, the inner surface 27 of heat insulating body 25 of the cover may float to assure a good sealing contact with the inner surface 13 of the sidewalls 11 of the body 15 of the solar oven 10. The strips 50 are sufficiently resilient to allow full seating engagement of cover 20 with respect to the inner end surface 13 of the heat insulation portion of body 15.

The particular arrangement illustrated in the drawings and forming the subject matter of the invention insures close contact between the cover or door 20 and the body 15, and particularly between the heat insulation portions thereof. This eliminates any air-gaps. Furthermore, the construction permits the insulation 25 of cover or door 20 to float in the door during closing and thus mate with the insulation 11 of the body 15. This results in perfect sealing of the heating compartment 35 and prevents loss of heat therefrom. Furthermore, the resilience of the strips 50 permits easy closing and latching of the cover 20 to the body 15.

The elements 50 eliminate the need for adhesive between the body 25 and the metal frame 23, thereby simplifying assembly. Moreover, since strips 50 are separated from the heated compartment 35 by the heat insulating body 25, they are not subjected to deterioration due to the intense heat of the solar oven.

While a specific embodiment of the invention has been shown and described in detail to illustrate the application of the principles of the invention, it will be understood that the invention may be embodied otherwise without departing from such principles.

What is claimed is:

1. A solar oven comprising, in combination, a body structure including a heating compartment defined laterally by wall means having an inner end surface and an outer end surface; said compartment being further defined by a cover hinged to said wall means adjacent said inner end surface; means adjacent said outer end surface for concentrating solar energy into said compartment to elevate the temperature thereof; said cover including an outer casing having an end wall, and a body of heat insulating material; said body of heat insulating material having an inner end surface arranged to matingly engage the inner end surface of said wall means to seal said compartment; and resilient means disposed between the end wall of said cover casing and said body of heat insulating material and biasing said body of heat insulating material into engagement with said wall means when said cover is closed.

2. A solar oven, as claimed in claim 1, in which said biasing means comprises compressible resilient material disposed between said body of heat insulating material and said end wall of said cover casing.

3. A solar oven, as claimed in claim 2, in which said resilient material is adhesively secured to said end wall of said cover casing and to the adjacent surface of said body of heat insulating material.

4. A solar oven, as claimed in claim 2, in which said resilient material is foam-type, resilient material.

5. A solar oven, as claimed in claim 2, in which said end wall of said cover casing is substantially rectangular; said resilient material being in the form of strips which are relatively narrow and thin and define a rectangle having sides parallel to the side edges of said rectangular end wall.

6. A solar oven, as claimed in claim 5, including a further strip of said material extending transversely of said rectangle intermediate the ends thereof.

7. A solar oven, as claimed in claim 3, in which said body of heat insulating material has a conforming fit within side walls of said cover casing, and floats with respect to the said side walls.

8. A solar oven, as claimed in claim 1, in which said body of heat insulating material has means on its inner surface for positioning a food chamber within said compartment.

References Cited by the Examiner
UNITED STATES PATENTS

| | | | |
|---|---|---|---|
| 681,095 | 8/01 | Baker | 126—270 |
| 1,074,219 | 9/13 | Skiff | 126—270 |
| 1,158,175 | 10/15 | Cherrier | 126—270 |
| 3,025,851 | 3/62 | Steinberg | 126—270 |
| 3,106,201 | 10/63 | Steinberg | 126—270 |

JAMES W. WESTHAVER, *Primary Examiner.*